US010991116B1

(12) United States Patent
Barish

(10) Patent No.: US 10,991,116 B1
(45) Date of Patent: Apr. 27, 2021

(54) THREE-DIMENSIONAL (3D) DEPTH IMAGING SYSTEMS AND METHODS FOR AUTOMATICALLY DETERMINING SHIPPING CONTAINER FULLNESS BASED ON IMAGING TEMPLATES

(71) Applicant: ZEBRA TECHNOLOGIES CORPORATION, Lincolnshire, IL (US)

(72) Inventor: Justin F. Barish, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/664,428

(22) Filed: Oct. 25, 2019

(51) Int. Cl.
  *G06T 7/60* (2017.01)
  *G06T 7/62* (2017.01)
  *G06T 15/08* (2011.01)
  *G06K 9/00* (2006.01)
  *H04N 13/204* (2018.01)

(52) U.S. Cl.
  CPC ............ *G06T 7/62* (2017.01); *G06K 9/00201* (2013.01); *G06T 15/08* (2013.01); *H04N 13/204* (2018.05); *G06T 2200/24* (2013.01); *G06T 2207/10028* (2013.01); *G06T 2207/20081* (2013.01); *G06T 2207/20132* (2013.01); *G06T 2215/16* (2013.01)

(58) Field of Classification Search
  CPC ....... G06T 7/62; G06T 15/08; G06T 2200/24; G06T 2207/10028; G06T 2207/20081; G06T 2207/20132; G06T 2215/16; H04N 13/204; G06K 9/00201
  See application file for complete search history.

(56) References Cited

U.S. PATENT DOCUMENTS

2017/0140550 A1\* 5/2017 Zhang ........................ G06T 7/50
2020/0109963 A1\* 4/2020 Zass ...................... G05D 1/0246

\* cited by examiner

*Primary Examiner* — Chong Wu
(74) *Attorney, Agent, or Firm* — Yuri Astvatsaturov

(57) ABSTRACT

Three-dimensional (3D) depth imaging systems and methods are disclosed for automatically determining shipping container fullness based on imaging templates. A 3D-depth camera captures 3D image data of a shipping container located in a predefined search space during a shipping container loading session. A container fullness application (app) receives the 3D image data, and determines therefrom a 3D container point cloud representative of a shipping container. An imaging template that defines a 3D template point cloud corresponding to a shipping container type of the shipping container is loaded into memory. A fullness value of the shipping container is determined based on a 3D mapping that is generated from alignment of a 3D container front portion of the 3D container point cloud with a 3D template front portion of the 3D template point cloud.

16 Claims, 9 Drawing Sheets

US 10,991,116 B1

THREE-DIMENSIONAL (3D) DEPTH IMAGING SYSTEMS AND METHODS FOR AUTOMATICALLY DETERMINING SHIPPING CONTAINER FULLNESS BASED ON IMAGING TEMPLATES

BACKGROUND OF THE INVENTION

In the transportation industry, shipping containers (e.g., shipping containers as used in air and/or ground transportation and shipping, such as unit load devices (ULDs)) are typically loaded using a variety of different techniques that take into account a variety of different sizes and configurations of boxes, packages, or other items for shipping or transit. In addition, shipping containers, themselves, typically have various sizes and storage capacities (e.g., where such shipping containers are constructed to handle different cargo sizes, loads and/or configurations). All of the various loading techniques, box sizes/configurations, and shipping container sizes/configurations create various permutations of loading strategies, techniques, and differences in overall loading operations that are difficult for loaders and/or managers overseeing loading of such commercial trailers to manage.

Such various permutations of loading strategies, sizes, and configurations create problems in tracking performance or quality of loading metrics across different personnel (e.g., loaders), each of which may be located in different geographic locations and/or employ different loading regimens. In particular, loaders or managers may desire a greater understanding and improved metrics relating to the efficiency of how their shipping containers are loaded so that they can employ or make better management decisions to improve loading time or otherwise loading efficiency for logistical operations associated with shipping containers.

In addition, problems arise from traditional shipping container loading strategies and techniques (e.g., such as traditional loading strategies for ULD containers). For example, during loading, it is often difficult to track the loading progress or status of a shipping container, as loaders move and arrange packages in or around the shipping container. This creates problems with loading logistics and decreases operational efficiencies within warehouses or other loading facilities, especially within large facilities that house tens of hundreds of shipping containers, which must be processed within a set period of time to meet shipping deadlines or other shipping standards.

Conventional techniques, including manually monitoring loading status of shipping containers, including container fullness, can be untenable, especially at large facilities. Such manual techniques tend to fail to provide an updated or current status of loading of shipping containers within a shipping facility, especially at large shipping facilities where there is generally a desire to track status of great many shipping containers across a wide storage area.

Existing systems attempt to solve these problems, but are often ineffective as they require weeks of algorithm adjustment to support various container types (e.g., such as additional code, parameter estimation/fitting, testing, etc.). In particular, existing techniques fail, especially within large scale shipping operations, as existing techniques require separate software coding for each shipping container, with numerous parameters that must be experimentally configured. For example, existing systems typically apply a "scaling factor" to estimate fullness, which are typically very slow to develop as such techniques require experimental calculations on each shipping container type to determine their specific "scaling factor." In addition, existing systems assume a cuboid container shape, most of which are actually not a cube, and, are therefore inaccurate as to their measurements as a result.

Accordingly, there is a need for three-dimensional (3D) depth imaging systems and methods for automatically determining shipping container fullness based on imaging templates as described further herein.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
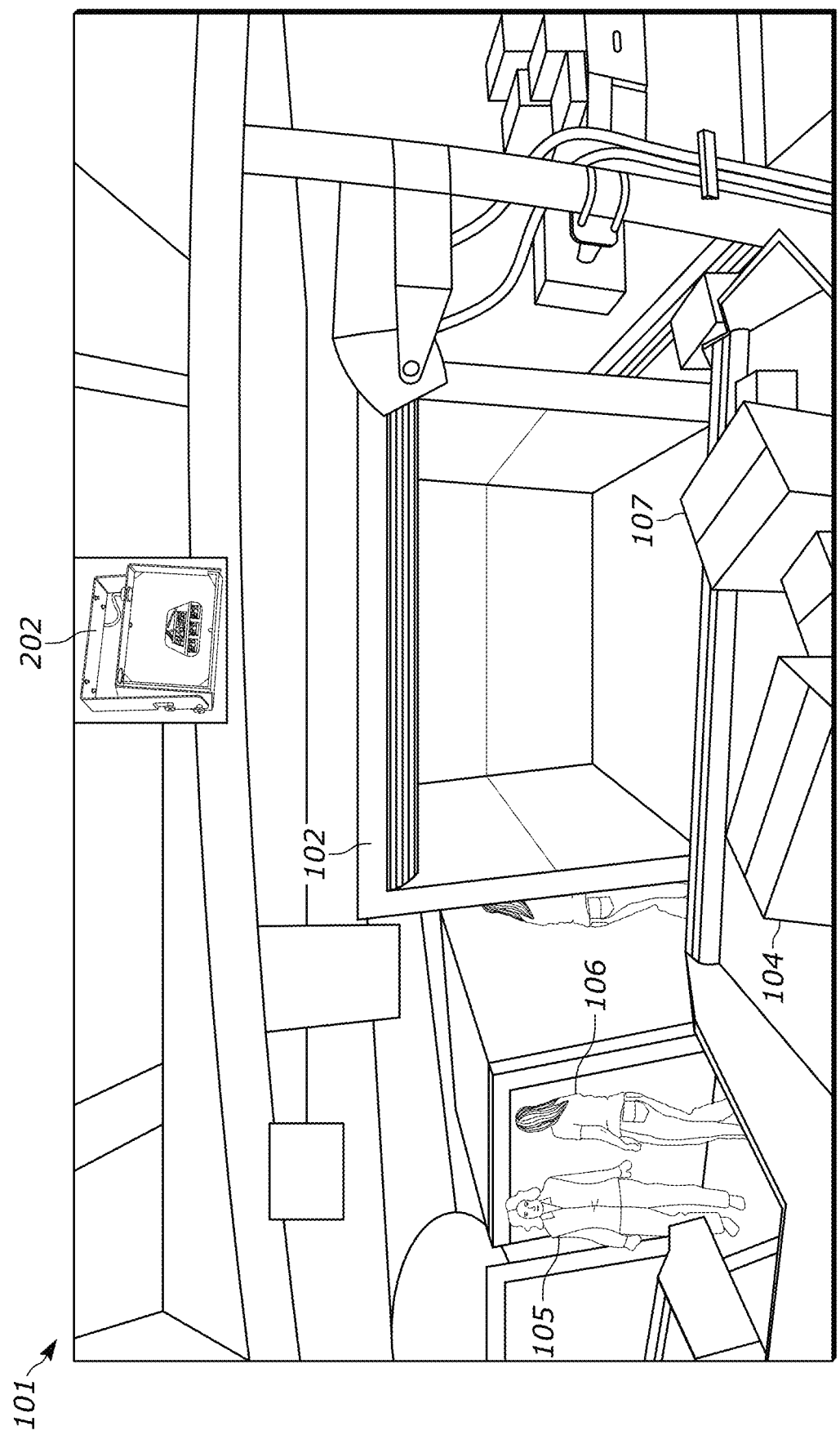
FIG. 1A is a perspective view, as seen from above, of a predefined search space of a loading facility that depicts a load monitoring unit (LMU) having a 3D-depth camera oriented in a direction to capture 3D image data of a shipping container during a shipping container loading session, in accordance with example embodiments herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The disclosure herein describes systems and methods for automatically determining shipping container fullness based on imaging templates. For example, in various embodiments, such systems and methods may be implemented to determine the fullness of a ULD container. As described herein, the disclosed systems and methods use templates or graphic models, which, in some embodiments may be an approximate CAD model of a given ULD converted to a 3D point cloud. In various embodiments, a template may be aligned to generate a 3D mapping that positions a ULD frame or model, in 3D virtual space, to determine a best-fit template-to-3D point cloud data match.

In various embodiments, once a template is mapped, aligned, or otherwise fitted within 3D space, a ratio of each 3D point's distance from the front of the template to the back of the template may be determined. In some embodiments, for example, an average of all ratios of the 3D points may be determined, yielding an overall fullness score. In this way, the disclosed systems and methods describe use of templates, which may be generated from CAD models of various ULDs, to properly calculate the fullness of a shipping container. The systems and methods described herein provide for a more efficient means of providing analytics that provides more accurate metrics, and is easily adaptable to new ULD types, than compared with conventional methods. That is, the systems and methods of the present disclosure dynamically determine the fullness of ULDs quickly, without requiring special adjustments for each ULD type.

The systems and methods described herein operate in a flexible way, while at the same time offering the potential for increased accuracy in reported metrics, due to the ability to determine all contours/shapes of a ULD. In addition, the use of templates allows the disclosed systems and methods to operate with no or few parameters needing to be calculated for each ULD. This allows for automatic and dynamic fullness determinations that accurately account for any contours/shapes of any current and/or new ULD or other types of shipping containers.

Accordingly, in various embodiments disclosed herein, a three-dimensional (3D) depth imaging system is disclosed for automatically determining shipping container fullness based on imaging templates. The 3D depth imaging system may include a 3D-depth camera configured to capture 3D image data. The 3D-depth camera is generally oriented in a direction to capture 3D image data of a shipping container located in a predefined search space during a shipping container loading session. The shipping container may have a shipping container type. The 3D depth imaging system may include a container fullness application (app) configured to execute on one or more processors communicatively coupled to the 3D-depth camera and determine, based on 3D image data received from the 3D-depth camera, a 3D container point cloud representative of the shipping container. The container fullness app may further be configured to load, into a memory communicatively coupled to the one or more processors, an imaging template that defines a 3D template point cloud corresponding to the shipping container type. The 3D template point cloud may comprise a 3D template front portion of the shipping container type and a 3D template back portion of the shipping container type. The container fullness app may further be configured to identify, within the 3D container point cloud, a 3D container front portion corresponding to a physical container front portion of the shipping container. In addition, the container fullness app may further be configured to generate a 3D mapping of the 3D container point cloud and the 3D template point cloud. The 3D mapping may comprise the 3D container front portion of the 3D container point cloud aligned with the 3D template front portion of the 3D template point cloud. In addition, the container fullness app may further be configured to determine, based on the 3D mapping, a fullness value of the shipping container.

In additional embodiments, a 3D depth imaging method is disclosed for automatically determining shipping container fullness based on imaging templates. The 3D depth imaging method may include determining, based on 3D image data received from a 3D-depth camera, a 3D container point cloud representative of a shipping container. In various embodiments, the shipping container may be located in a predefined search space during a shipping container loading session. The shipping container may have a shipping container type. The 3D depth imaging method may include loading, into a memory communicatively coupled to one or more processors, an imaging template that defines a 3D template point cloud corresponding to the shipping container type. The 3D template point cloud may comprise a 3D template front portion of the shipping container type and a 3D template back portion of the shipping container type. The 3D depth imaging method may further include identifying, within the 3D container point cloud, a 3D container front portion corresponding to a physical container front portion of the shipping container. The 3D depth imaging method may further include generating a 3D mapping of the 3D container point cloud and the 3D template point cloud. The 3D mapping may comprise the 3D container front portion of the 3D container point cloud aligned with the 3D template front portion of the 3D template point cloud. The 3D depth imaging method may further include determining, based on the 3D mapping, a fullness value of the shipping container.

In still further embodiments, a tangible, non-transitory computer-readable medium storing instructions for automatically determining shipping container fullness based on imaging templates is described. In such embodiments, the non-transitory computer-readable medium storing instructions, when executed by one or more processors of a computing device, cause the one or more processors of the computing device to determine, based on 3D image data received from a 3D-depth camera, a 3D container point cloud representative of a shipping container The shipping container may be located in a predefined search space during a shipping container loading session. The shipping container may have a shipping container type. In addition, the instructions may cause the one or more processors of the computing device to load, into a memory communicatively coupled to one or more processors, an imaging template that defines a 3D template point cloud corresponding to the shipping container type. The 3D template point cloud may comprise a 3D template front portion of the shipping container type and a 3D template back portion of the shipping container type. In addition, the instructions may cause the one or more processors of the computing device to identify, within the 3D container point cloud, a 3D container front portion corresponding to a physical container front portion of the shipping container. Still further, the instructions may cause the one or more processors of the computing device to generate a 3D mapping of the 3D container point cloud and the 3D template point cloud. In various embodiments, the 3D mapping may comprise the 3D container front portion of the 3D container point cloud aligned with the 3D template front portion of the 3D template point cloud. In addition, the instructions may cause the one or more processors of the computing device to determine, based on the 3D mapping, a fullness value of the shipping container.

The 3D depth imaging systems and methods disclosed herein may be further appreciated by the various Figures disclosed herein.

FIG. 1A is a perspective view, as seen from above, of a predefined search space 101 of a loading facility that depicts a load monitoring unit (LMU) 202 having a 3D-depth camera oriented in a direction to capture 3D image data of a shipping container 102 during a shipping container loading session, in accordance with example embodiments herein. As depicted, shipping container 102 has a shipping container type of "AMJ." Generally, a shipping container is selected from one of several differently dimensioned containers. In various embodiments, shipping containers may comprise any type of unit load device (ULD). For example, a shipping container type may be of any ULD type, including, for example, any of an AMJ type, an AAD type, an AKE type, an AYY type, a SAA type, and APE type, or an AQF type. For ULD shipping containers, the first letter (e.g., "A" for "Certified aircraft container") indicates a specific type of ULD container, such as certified, thermal, etc.; the second letter represents base size in terms of dimensions (e.g., "M" for 96×125 inch); and the third letter represents a side contour size and shape (e.g., "J" for a cube shaped ULD container having a diagonal sloping roof portion on one side only). More generally, however, a shipping container may be any aircraft-based shipping container.

Predefined search space 101 may be determined based on the shipping container size, dimensions, or otherwise configuration and/or the area in which the shipping area is localized. For example, in one embodiment, predefined search space 101 may be determined based on ULD type, shape, or position within a general area. As shown in FIG. 1A, for example, predefined search space 101 is determined based on the size and dimensions of the shipping container 102 which is of type AMJ. In general, predefined search space 101 is defined so as to completely (or at least partially) include or image the shipping container.

FIG. 1A additionally depicts, within predefined search space 101, personnel or loaders 105 and 106 that may load packages 104 and 107 into the shipping container 102. In the embodiment of FIG. 1A, shipping container 102 may be loaded by loaders 105 and 106 with packages 104 and 107 during a loading session. The loading session includes loading a set or group of identified packages (e.g., packages 104 and 107) into shipping container 102. The loaders 105 and 106 and packages 104 and 107, by movement through the predefined search space 101, may generally cause occlusion and interference with the 3D-depth camera 202 (as discussed for FIG. 2) capturing 3D image data, over time, of shipping container 102.

Figure 1B:
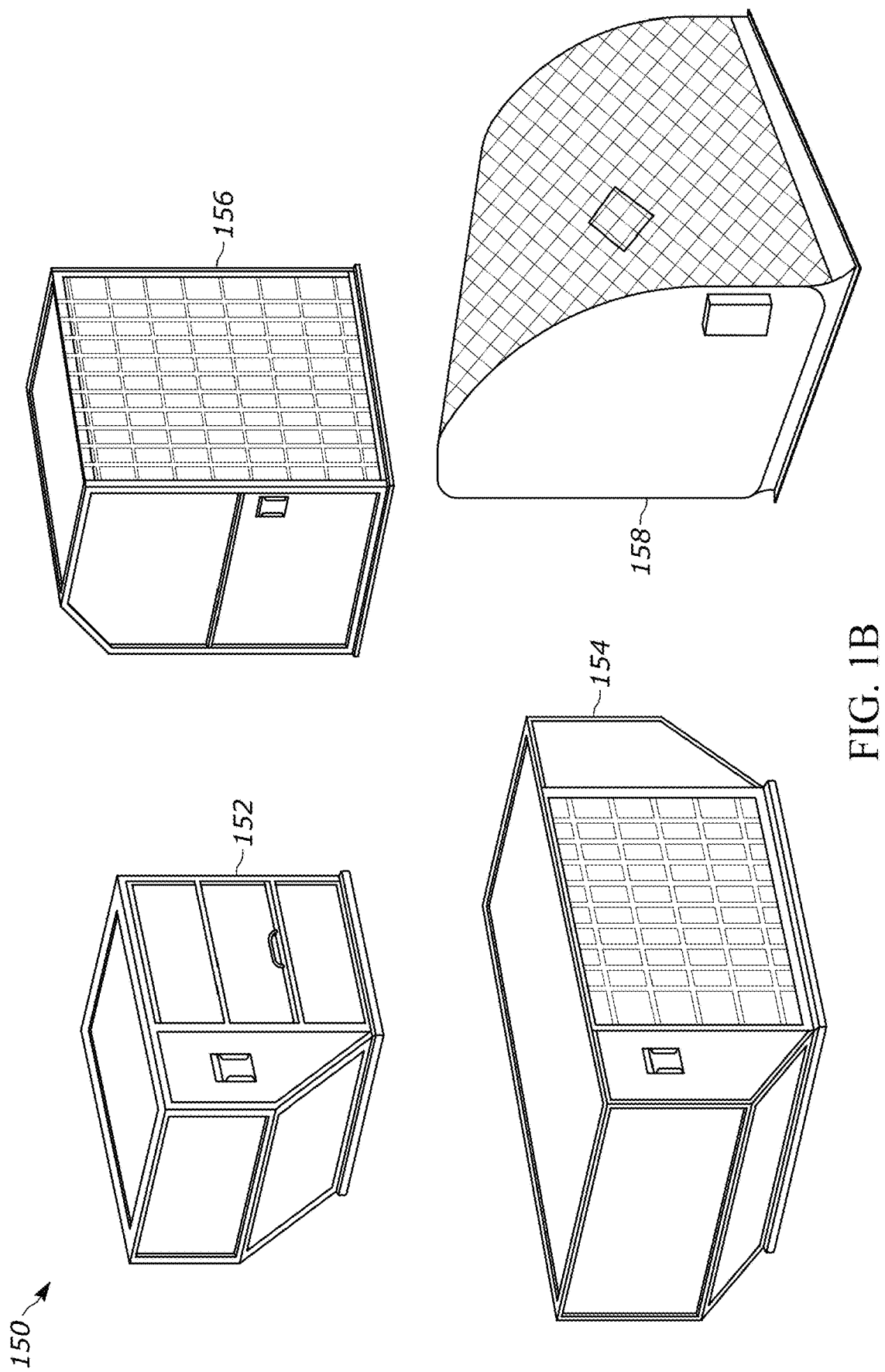
FIG. 1B illustrates perspective views of various shipping container types having different shapes and sizes including a shipping container type of the shipping container depicted in FIG. 1A, in accordance with example embodiments herein.

FIG. 1B illustrates perspective views of various shipping container types 150 having different shapes and sizes including a shipping container type (e.g., AMJ shipping container type 156) of the shipping container depicted in FIG. 1A, in accordance with example embodiments herein. Specifically, as shown in FIG. 1B, the example shipping container types depicted include an AKE shipping container type 152, a DQF shipping container type 154, an AMJ shipping container type 156, and an AAX shipping container type 158. As illustrated in FIG. 1B, each of the shipping container types 150 have different shapes, sizes, and dimensions for storing or otherwise containing shipped items such as packages. Shipping container 102 of FIG. 1A has AMJ shipping container type 156. The example embodiments of FIG. 1B, the shipping container types are represented as ULD shipping container types, however, it should be understood that additional and/or different shipping container types may also be used with the imaging systems and methods disclosed herein.

Figure 2:
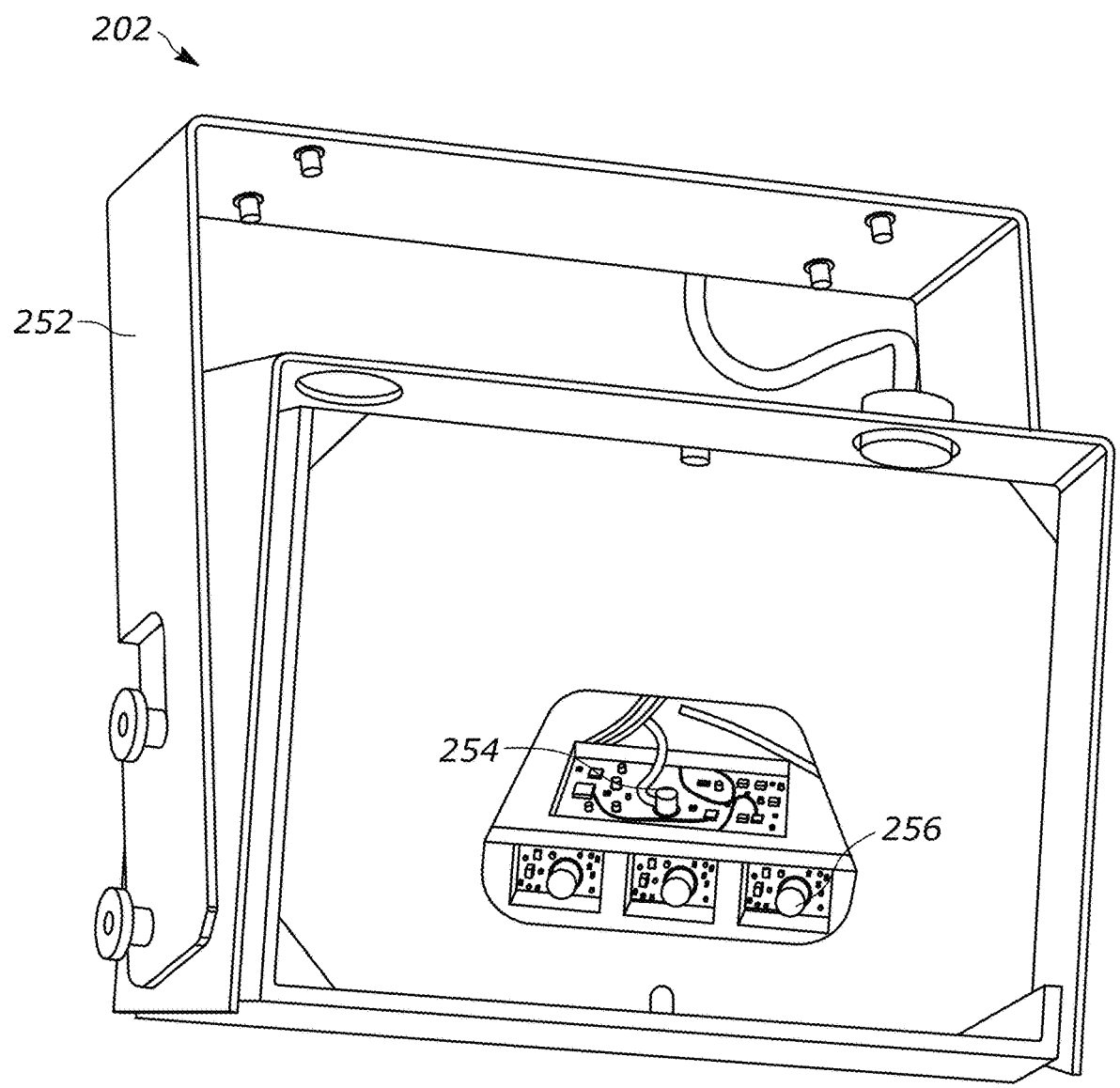
FIG. 2 is a perspective view of the LMU of FIG. 1A, in accordance with example embodiments herein.

FIG. 2 is a perspective view of the LMU of FIG. 1, in accordance with example embodiments herein. In various embodiments, LMU 202 is a mountable device. Generally, an LMU 202 comprises camera(s) and a processing board and is configured to capture data of a loading scene (e.g., a scene including FIG. 1A described herein). LMU 202 may run container fullness estimation and other advanced analytical algorithms.

LMU 202 may include a 3D-depth camera 254 for capturing, sensing, or scanning 3D image data/datasets. For example, in some embodiments, the 3D-depth camera 254 may include an Infra-Red (IR) projector and a related IR camera. In such embodiments, the IR projector projects a pattern of IR light or beams onto an object or surface, which, in various embodiments herein, may include surfaces or areas of a predefined search space (e.g., predefined search space 101) or objects within the predefined search area 101, such as boxes or packages (e.g., packages 104 and 107) and storage container 102. The IR light or beams may be distributed on the object or surface in a pattern of dots or points by the IR projector, which may be sensed or scanned by the IR camera. A depth-detection app, such as a depth-detection app executing on the one or more processors or memories of LMU 202, can determine, based on the pattern of dots or points, various depth values, for example, depth values of predefined search space 101. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or LMU 202 to generate a depth map. The depth map may represent a 3D image of, or contain 3D image data of, the objects or surfaces that were sensed or scanned by the 3D-depth camera 254, for example, the predefined search space 101 and any objects, areas, or surfaces therein.

LMU 202 may further include a photo-realistic camera 256 for capturing, sensing, or scanning 2D image data. The photo-realistic camera 256 may be an RGB (red, green, blue) based camera for capturing 2D images having RGB-based pixel data. In some embodiments, the photo-realistic camera 256 may capture 2D images, and related 2D image data, at the same or similar point in time as the 3D-depth camera 254 such that the LMU 202 can have both sets of 3D image data and 2D image data available for a particular surface, object, area, or scene at the same or similar instance in time.

In various embodiments as described herein, LMU 202 may be a mountable device that includes a 3D-depth camera for capturing 3D images (e.g., 3D image data/datasets) and a photo-realistic camera (e.g., 2D image data/datasets). The photo-realistic camera may be an RGB (red, green, blue)

camera for capturing 2D images, such as the image of FIG. 1. LMU 202 may also include one or more processors and one or more computer memories for storing image data, and/or for executing apps that perform analytics or other functions as described herein. In various embodiments, and as shown in FIG. 1, the LMU 202 may be mounted within a loading facility and oriented in the direction of predefined search space 101 to capture 3D and/or 2D image data of shipping container 102. For example, as shown in FIG. 1, LMU 202 may be oriented such that the 3D and 2D cameras of LMU 202 may capture 3D image data of shipping container 102, e.g., where LMU 202 may scan or sense the walls, floor, ceiling, packages, or other objects or surfaces within the predefined search space 101 to determine the 3D and 2D image data. The image data may be processed by the one or more processors and/or memories of the LMU 202 (or, in some embodiments, one or more remote processors and/or memories of a server) to implement analysis, functions, such as graphical or imaging analytics, as described by the one or more various flowcharts, block diagrams, methods, functions, or various embodiments herein. It should be noted that LMU 202 may capture 3D and/or 2D image data/datasets of a variety of loading facilities or other areas, such that additional loading facilities or areas (e.g., warehouses, etc.) in addition to the predefined search spaces (e.g., predefined search space 101) are contemplated herein.

In some embodiments, for example, LMU 202 may process the 3D and 2D image data/datasets, as scanned or sensed from the 3D-depth camera and photo-realistic camera, for use by other devices (e.g., client device 700 or server 301, as further described herein). For example, the one or more processors and/or one or more memories of LMU 202 may capture and/or process the image data or datasets scanned or sensed from a predefined search space (e.g., the view or scene of FIG. 1A). The processing of the image data may generate post-scanning data that may include metadata, simplified data, normalized data, result data, status data, or alert data as determined from the original scanned or sensed image data. In some embodiments, the image data and/or the post-scanning data may be sent to a client device/client application, such as a dashboard app that may be, for example, installed and executing on client device 700 (as further described herein with respect to FIG. 7), for viewing, manipulation, or otherwise interaction. In other embodiments, the image data and/or the post-scanning data may be sent to a server (e.g., server 301 as further described herein) for storage or for further manipulation. For example, the image data and/or the post-scanning data may be sent to a server, such as server 301. In such embodiments, the server or servers may generate post-scanning data that may include metadata, simplified data, normalized data, result data, status data, or alert data as determined from the original scanned or sensed image data provided by LMU 202. As described herein, the server or other centralized processing unit and/or storage may store such data, and may also send the image data and/or the post-scanning data to a dashboard app, or other app, implemented on a client device, such as the dashboard app implemented on client device 700 of FIG. 7.

LMU 202 may include a mounting bracket 252 for orienting or otherwise positioning the LMU 202 within a loading facility associated with predefined search space 101 as described herein for FIG. 1A. The LMU 202 may further include one or more processors and one or more memories for processing image data as described herein. For example, the LMU 202 may include flash memory used for determining, storing, or otherwise processing the imaging data/datasets and/or post-scanning data. In addition, LMU 202 may further include a network interface to enable communication with other devices (such as server 301 of FIG. 3 as described herein). The network interface of LMU 202 may include any suitable type of communication interface(s) (e.g., wired and/or wireless interfaces) configured to operate in accordance with any suitable protocol(s), e.g., Ethernet for wired communications and/or IEEE 802.11 for wireless communications.

Figure 3:
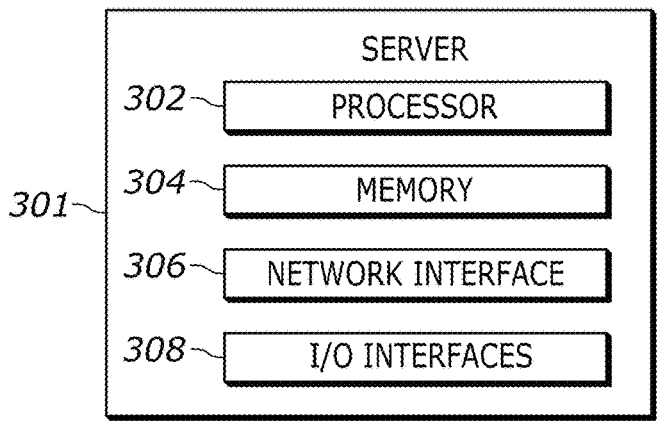
FIG. 3 is a block diagram representative of an embodiment of a server associated with the loading facility of FIG. 1A and the 3D-depth camera of FIG. 2.

FIG. 3 is a block diagram representative of an embodiment of a server associated with the loading facility of FIG. 1 and the LMU 202 of FIG. 2. In some embodiments, server 301 may be located in the same facility as loading facility of FIG. 1. In other embodiments, server 301 may be located at a remote location, such as on a cloud-platform or other remote location. In either embodiment, server 301 may be communicatively coupled to a 3D-depth camera (e.g., LMU 202).

Server 301 is configured to execute computer instructions to perform operations associated with the systems and methods as described herein, for example, implement the example operations represented by the block diagrams or flowcharts of the drawings accompanying this description. The server 301 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc. Other technologies or platforms, such as Ruby on Rails, Microsoft .NET, or similar may also be used. As described below, the server 301 may be specifically configured for performing operations represented by the block diagrams or flowcharts of the drawings described herein.

The example server 301 of FIG. 3 includes a processor 302, such as, for example, one or more microprocessors, controllers, and/or any suitable type of processor. The example server 301 of FIG. 3 further includes memory (e.g., volatile memory or non-volatile memory) 304 accessible by the processor 302, for example, via a memory controller (not shown). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the server 301 to provide access to the machine-readable instructions stored thereon.

The example server 301 of FIG. 3 may further include a network interface 306 to enable communication with other machines via, for example, one or more computer networks, such as a local area network (LAN) or a wide area network (WAN), e.g., the Internet. The example network interface 306 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example server 301 of FIG. 3 includes input/output (I/O) interfaces 308 to enable receipt of user input and communication of output data to the user, which may include, for example, any number of keyboards, mice, USB drives, optical drives, screens, touchscreens, etc.

Figure 4:
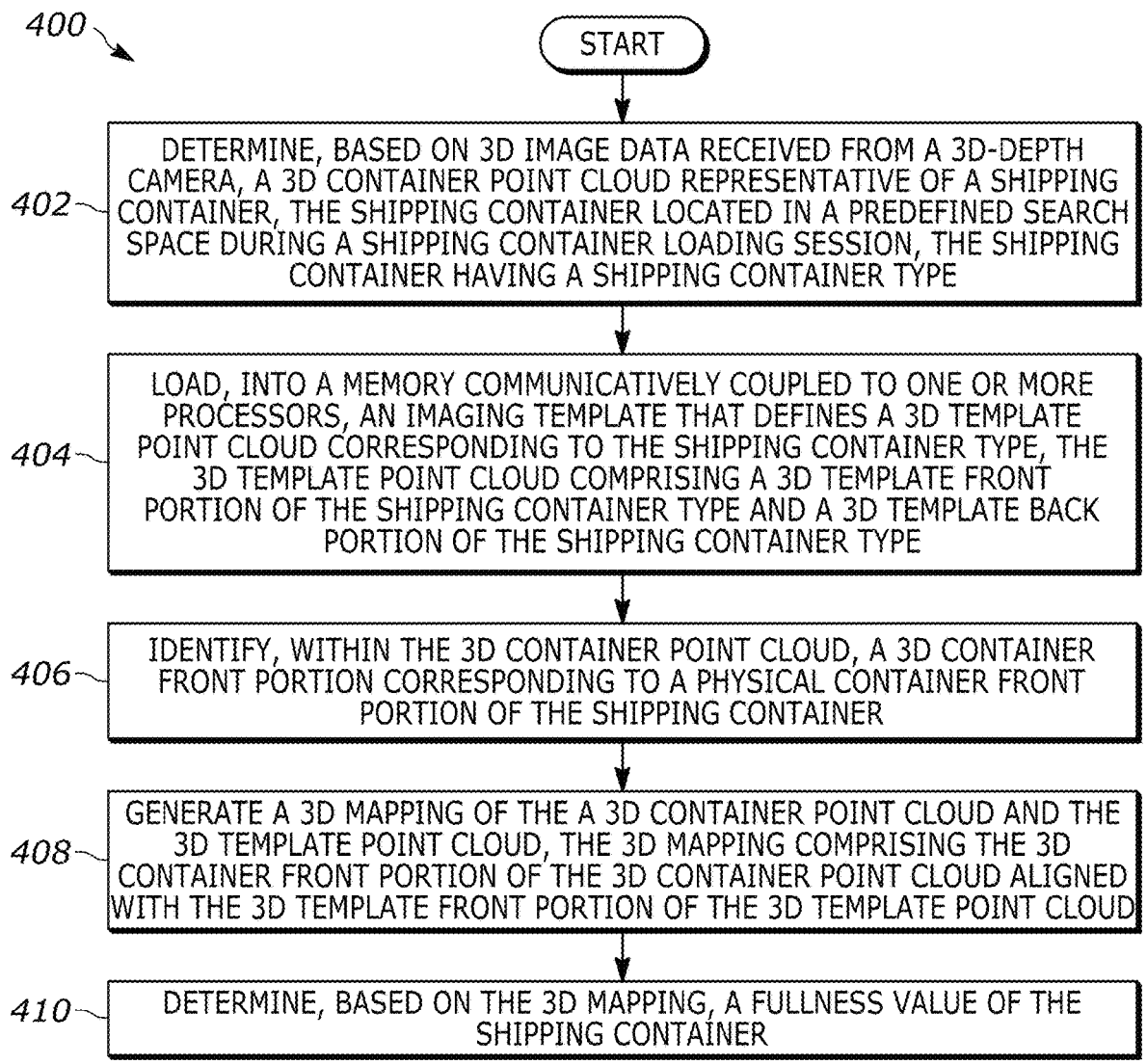
FIG. 4 is a flow chart for a 3D depth imaging method for automatically determining shipping container fullness based on imaging templates, in accordance with example embodiments herein.
Figure 6A:
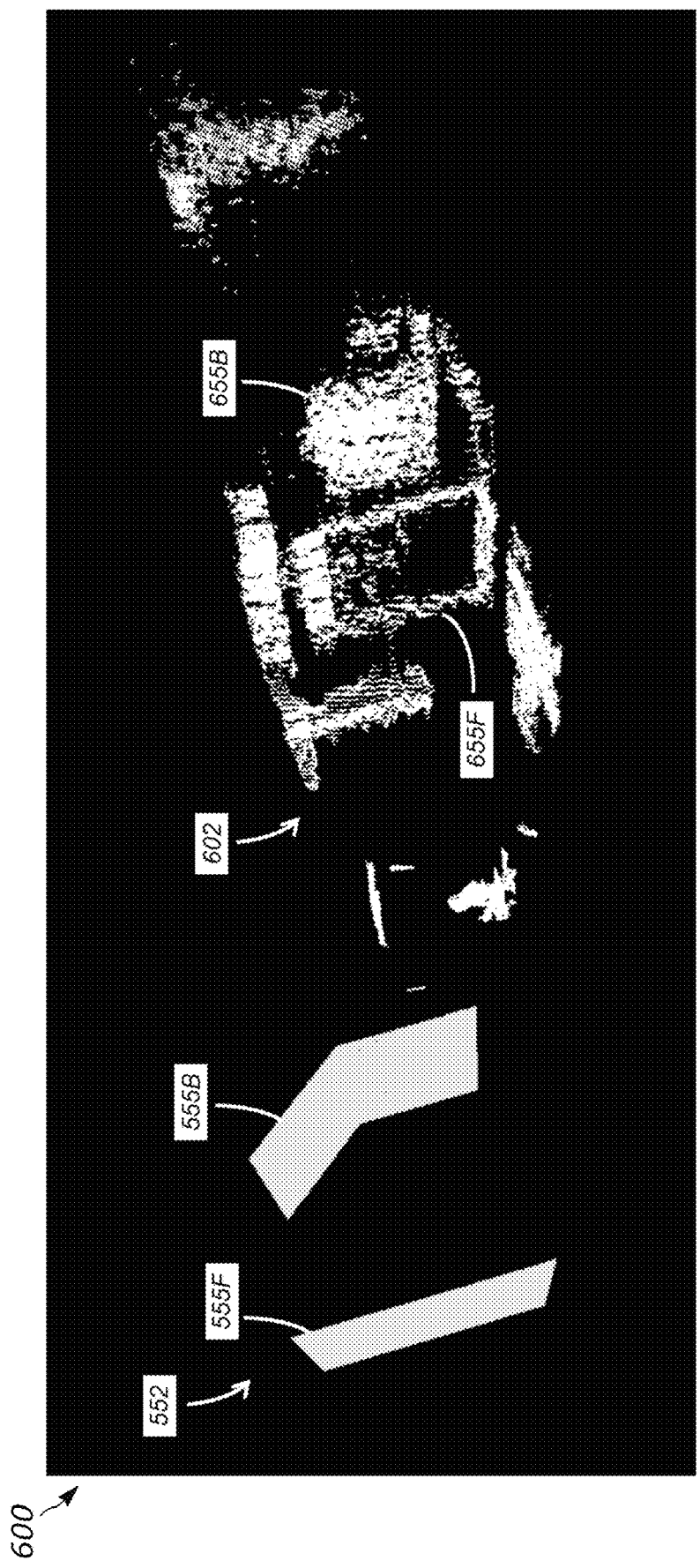
FIG. 6A illustrates an example embodiment of a 3D container point cloud, as captured by the 3D-depth camera of FIG. 1, and as rendered together with the 3D template point cloud of FIG. 5B, in accordance with example embodiments herein.

FIG. 4 is a flow chart for a 3D depth imaging method 400 for automatically determining shipping container fullness based on imaging templates, in accordance with example embodiments herein. Method 400 may execute on a processor of LMU 202 and/or server 301. At block 402, 3D depth imaging method 400 includes determining, based on 3D image data received from a 3D-depth camera (e.g., 3D-depth camera 254), a 3D container point cloud representative of a shipping container (e.g., storage container 102). For example, 3D container point cloud 602 of FIG. 6A illustrates a 3D container point cloud and/or 3D image data received from 3D-depth camera 254. In various embodiments, the 3D container point cloud is representative of the shipping container (e.g., shipping container 102). In some embodiments, the point cloud of the shipping container may be a cropped portion of point cloud data of the 3D image data received from the 3D-depth camera (e.g., 3D-depth camera 254).

In various embodiments, shipping container (e.g., shipping container 102) may be located in a predefined search space (e.g., the search space of FIG. 1A) during a shipping container loading session. As described herein, shipping container 102 may have a shipping container type (e.g., AMJ shipping container type 156). As described herein, the shipping container type may be selected from various shipping container types, including, but not limited to a ULD type such as an AMJ type, an AAD type, an AKE type, an AYY type, a SAA type, an APE type, or an AQF type.

At block 404, 3D depth imaging method 400 includes loading, into a memory communicatively coupled to one or more processors (e.g., of LMU 202), an imaging template that defines a 3D template point cloud (e.g., 3D template point cloud 552) corresponding to the shipping container type (e.g., AMJ shipping container type 156). This is further illustrated by FIGS. 5A and 5B described herein.

In some embodiments, an imaging template may be preloaded into the memory. For example, in some embodiments, all or most imaging templates (e.g., representing all or most shipping container types that may be imaged within a shipping facility) may be loaded into memory of an LMU (e.g., LMU 202) or a server (e.g., server 301). Such loading may occur on LMU startup to allow for faster image recognition and/or processing of shipping containers within a given shipping facility.

Figure 5A:
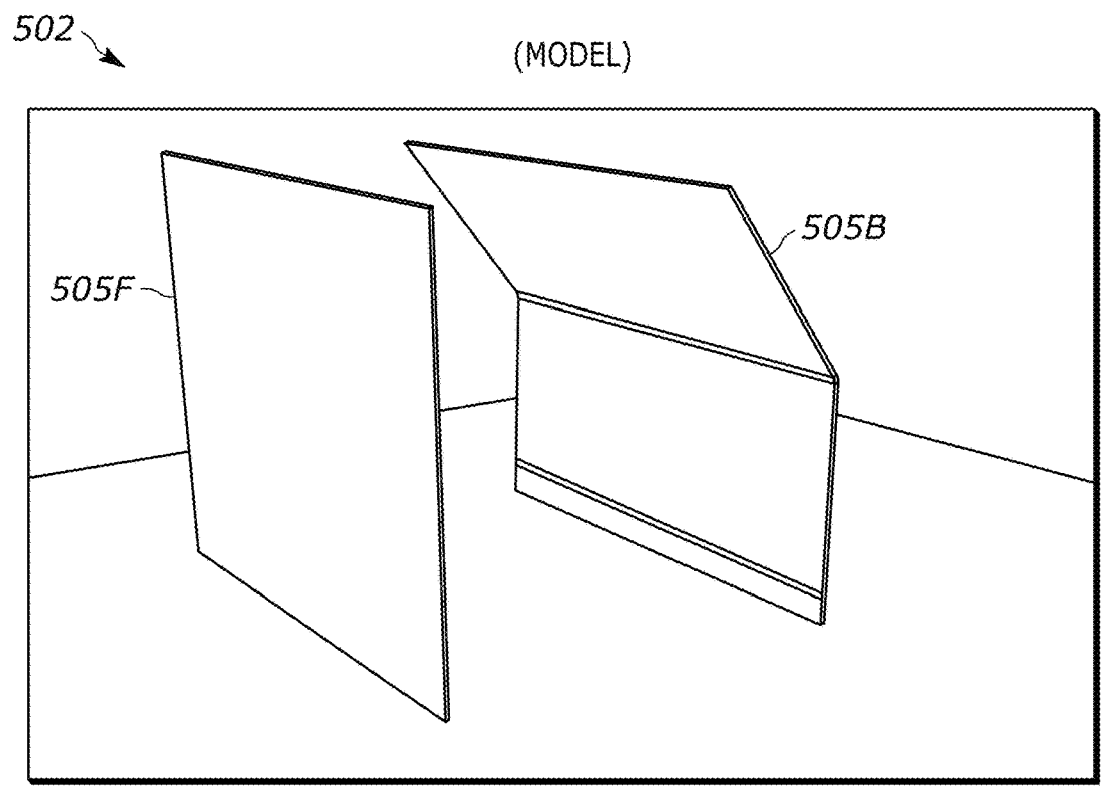
FIG. 5A illustrates an example embodiment of a non-point cloud template depicted as a computer aided design (CAD) model, in accordance with example embodiments herein.
Figure 5B:
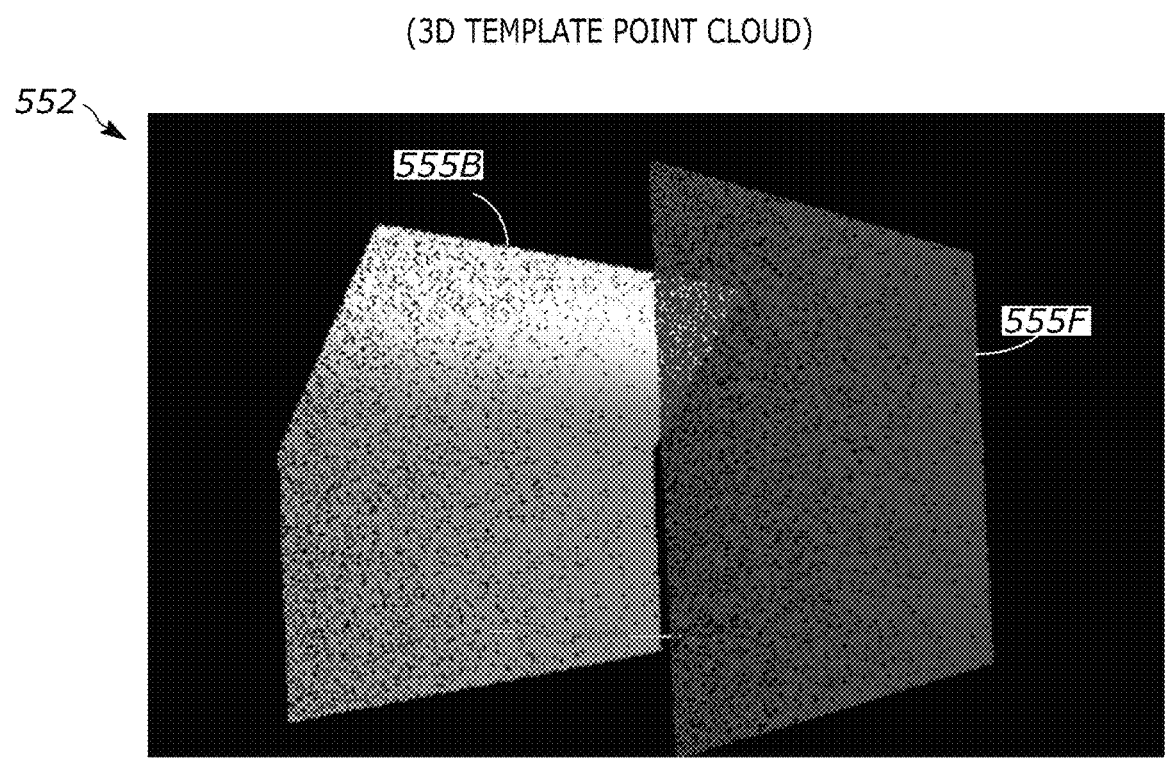
FIG. 5B illustrates an example embodiment of a 3D template point cloud defined from the CAD model of FIG. 5A, in accordance with example embodiments herein.

For example, FIG. 5B illustrates an example embodiment of a 3D template point cloud 552 defined from the CAD model of FIG. 5A, in accordance with example embodiments herein. As illustrated in FIG. 5B, 3D template point cloud 552 is comprised of point cloud data or 3D data. The point cloud data of 3D template point cloud 552 defines a 3D template front portion 555f of a shipping container type (e.g., AMJ shipping container type 156) and a 3D template back portion 555b of the shipping container type (e.g., AMJ shipping container type 156), which correspond to the shipping container imaged by 3D-depth camera 254.

In some embodiments, the imaging template that is loaded into memory to define a 3D template point cloud (e.g., 3D template point cloud 552) begins as a non-point cloud imaging template. In such embodiments, loading the imaging template may include converting, by the one or more processors, the non-point cloud template to the 3D template point cloud (e.g., 3D template point cloud 552). For example, FIG. 5A illustrates an example embodiment of a non-point cloud template 502 depicted as a computer aided design (CAD) model, in accordance with example embodiments herein. In the embodiment of FIG. 5A, the CAD model represents a shipping container (e.g., shipping container 102) as a ULD having the AMJ shipping container 156. As depicted in FIG. 5A, the CAD model defines a template front portion 505f of a shipping container type (e.g., AMJ shipping container type 156) and a template back portion 505b of the shipping container type (e.g., AMJ shipping container type 156), which correspond to the shipping container imaged by 3D-depth camera 254.

Template front portion 505f and/or template back portion 505b may be converted by a processor (e.g., of LMU 202 or server 301) to define the 3D template point cloud 552, and, particularly, 3D template front portion 555f and 3D template back portion 555b of 3D template point cloud 552.

In some embodiments, the imaging template (e.g., non-point cloud template 502 or 3D template point cloud 552) may be determined, e.g., by a container fullness application (app), based on the 3D image data received from the 3D-depth camera (e.g., 3D-depth camera 254). For example, upon loading an imaging template, a corresponding imaging template that matches the ULD may be selected. For example, in some embodiments, a machine learning model, trained with 3D image data defining a plurality of shipping container types (e.g., including those of FIG. 1B), may input the 3D image data as captured by 3D-depth camera 254 and may output the shipping container type. The outputted shipping container type may then be used to load or otherwise select an imaging template that corresponds to the shipping container.

For example, the container fullness app may be trained using a supervised or unsupervised machine learning program or algorithm. The machine learning program or algorithm may employ a neural network, which may be a convolutional neural network, a deep learning neural network, or a combined learning module or program that learns in two or more features or feature datasets in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. Machine learning may involve identifying and recognizing patterns in existing data (such as shapes, sizes, dimensions of ULDs) in order to facilitate making predictions for subsequent data (to determine or select a imaging template to select for determining 3D template point clouds)

Machine learning model(s), such as those of container fullness app, may be created and trained based upon example (e.g., "training data,") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

FIG. 6A illustrates an example embodiment of a 3D container point cloud 602, as captured by the 3D-depth camera of FIG. 1, and as rendered together with the 3D template point 552 cloud of FIG. 5B, in accordance with example embodiments herein. As shown in FIG. 6A, 3D template point 552 cloud is rendered with its template front portion 555f and template back portion 555b together in the same 3D scene 600 with 3D container point cloud 602. 3D container point cloud 602 similarly comprises 3D container front portion 655f and 3D container back portion 655b which define 3D representations of the front and back portions, respectively, of shipping container 102 as captured by LMU 202.

With respect to FIG. 4, at block 406, 3D depth imaging method 400 includes identifying, within the 3D container point cloud 602, the 3D container front portion 665f corresponding to a physical container front portion of the shipping container (e.g., shipping container 102). For example, front portion 665f represents the front opening of shipping container 102.

Figure 6B:
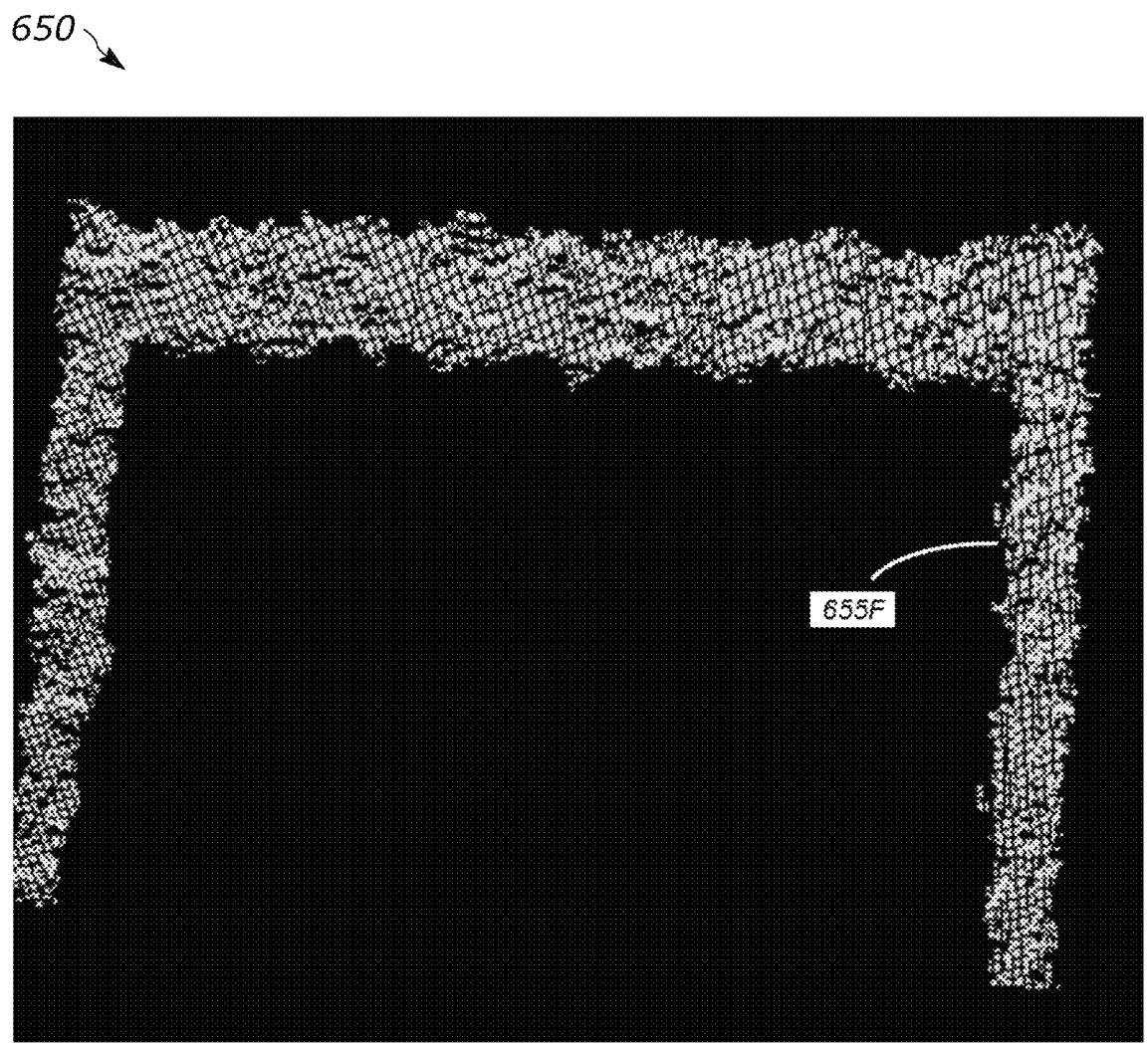
FIG. 6B illustrates an example embodiment of a 3D container front portion determined from the 3D container point cloud of FIG. 6A, in accordance with example embodiments herein.

In some embodiments, a perimeter of the front portion 665f is identified within the 3D container point cloud 602 and is cropped out. For example, FIG. 6B illustrates an example embodiment of a 3D container front portion 655f determined and cropped from the 3D container point cloud of FIG. 6A, in accordance with example embodiments herein.

With respect to FIG. 4, at block 408, 3D depth imaging method 400 includes generating a 3D mapping of the 3D container point cloud 602 and the 3D template point cloud 552. For example, FIG. 6C illustrates an example embodiment of a 3D mapping 680 as generated based on the 3D container point cloud 602 and the 3D template point cloud 552 of FIG. 6A, in accordance with example embodiments herein. 3D mapping 680 comprises 3D container front portion 665f of 3D template point cloud 602 aligned with 3D template front portion 555f of the 3D template point cloud 552.

Generally, 3D mapping 680 is generated by a transformation matrix as determined as needed to translate or align 3D template point cloud 552 to the shipping container in 3D container point cloud 602. The transformation matrix applies matrix or vector alignment to match up points (e.g., 3D x, y, and z coordinates or points) from each of 3D container point cloud 602 and 3D template point cloud 552 in 3D space.

Figure 6C:
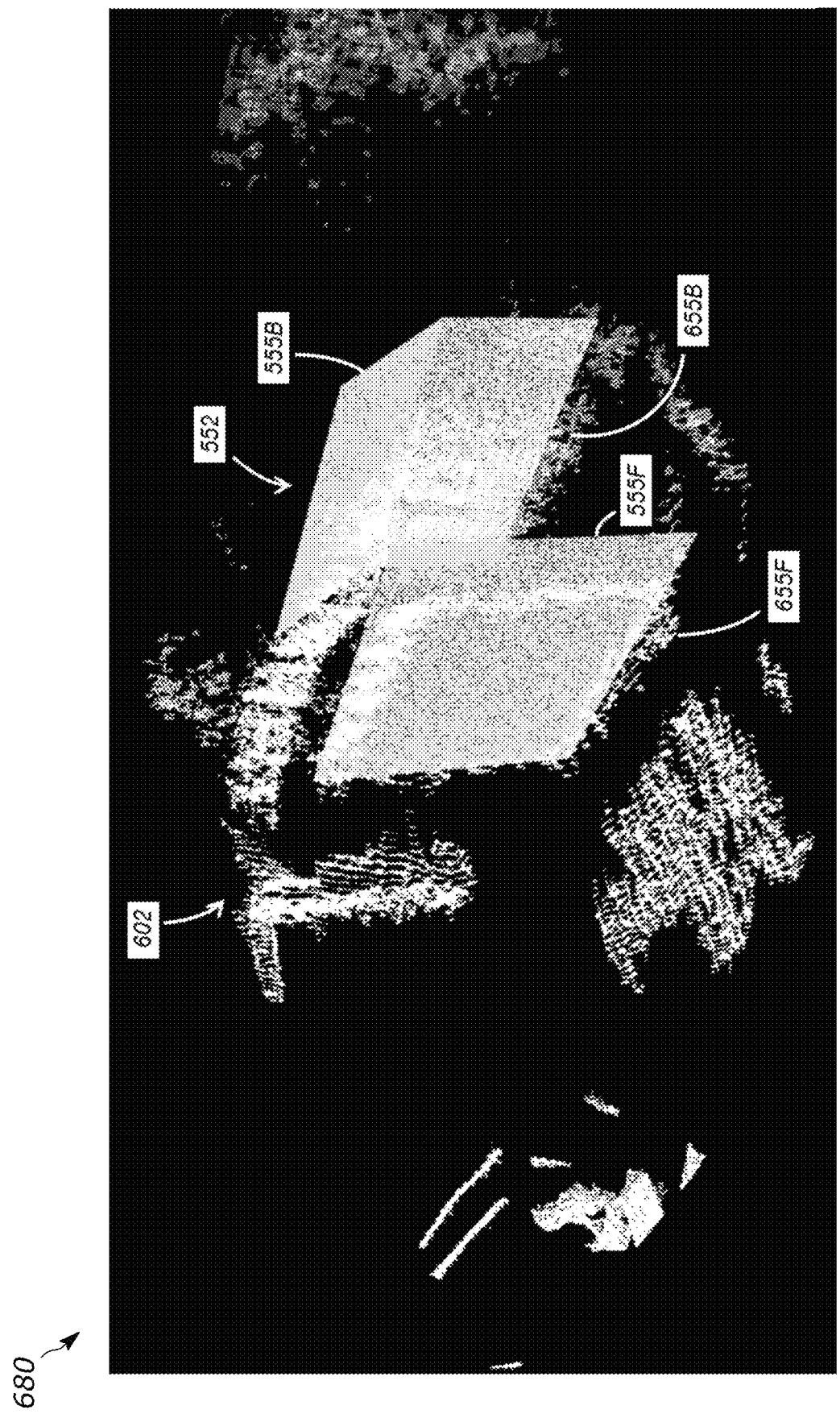
FIG. 6C illustrates an example embodiment of a 3D mapping as generated based on the 3D container point cloud and the 3D template point cloud of FIG. 6A, in accordance with example embodiments herein.

In particular embodiments, as shown for FIG. 6C, the container fullness app aligns 3D container front portion 555f of the 3D template point cloud 552 with 3D template front portion 655f of the 3D template point cloud 602. In various embodiments, the alignment may be with respect to a left edge or, alternatively, a right edge of the shipping container or front portion (e.g., 3D container front portion 555f or 3D template front portion 655f). For example, in some embodiments, a size of template point cloud 552 relative to the size of a cropped-out ULD perimeter from 3D template point cloud 602 may be used to estimate what portions (e.g., such as 3D container front portion 655f as shown in FIG. 6B) of the perimeter to search for within 3D container point cloud 602 to find the outside edges.

In some embodiments, once region analysis on the left and right side of the perimeter (e.g., left and right side of 3D container front portion 655f as shown in FIG. 6B) is determined, then the outer portions of the shipping container within 3D template point cloud 602 may be determined. In such embodiments, for example, for the left side outer portion, the container fullness app may determine an average of a given percentage of points (e.g., 25% of points) with the smallest x-values that fall in the left area (left area as depicted in FIG. 6B, where the x-axis runs left-right in FIG. 6B). Similarly, for the right side, the container fullness app may determine an average of a given percentage of points (e.g., 25% of points) with the largest x-values that fall in the right area (right area as depicted in FIG. 6B, where the x-axis runs left-right in FIG. 6B). The same process may be repeated for the 3D template point cloud 552, specifically to find the left and right outer portions of the 3D template front portion 555f. The left and right outer portions of the shipping container of 3D template point cloud 552 may then be matched or aligned to the left and right outer portions of the shipping container of 3D container point cloud 602.

In some, embodiments a match score determines alignment, i.e., how many 3D points of the 3D container point cloud 602 aligns or matches to template point cloud 552. That is, a match score may describe a numeric value relative to the distance between specific points. In some embodiments, an ideal match score (corresponding to a closest alignment) may be smallest distance between keystone point (lower left of container) or lowest sum or average value of points overall. For example, to align 3D template point cloud 552 template to the 3D container point cloud 602, an iterative closest point algorithm may be executed by container fullness app to determine the match score between the 3D template point cloud 552 template and the 3D container point cloud 602. The container fullness app can adjust or move one or both of the 3D template point cloud 552 or the 3D container point cloud 602 in all directions until the match score reaches a desired level or threshold value. In such embodiments, generating the 3D mapping 608 may comprise executing a closest point algorithm that generates a 3D match score based on distances between a first set of 3D points of the 3D container point cloud 602 and a second set of 3D points of the 3D template point cloud 552.

With respect to FIG. 4, at block 410, 3D depth imaging method 400 includes determining, based on the 3D mapping, a fullness value of the shipping container. In various embodiments, the fullness value may be represented as a percentage value defining how full the shipping container is (e.g., shipping container 102).

In some embodiments, determining the fullness value comprises projecting the 3D mapping onto a two-dimensional (2D) grid corresponding to a storage area of the shipping container. For example, using the 3D mapping (e.g., 3D mapping 680), additional 3D image data may be captured of the shipping container (e.g., shipping container 102) over time (e.g., every 15 seconds). For each 3D point captured that corresponds or falls within the bounds of the 3D mapping, an iterative closest point algorithm may be applied to the 3D mapping and its corresponding 2D grid to find corresponding points on the front and back walls of the 3D mapping (e.g., 3D template front portion 655f and 3D container back portion 655b). The ratio of these distances may then be determined by container fullness app. The ratio may indicate a percentage full at that one point. Then, the average, median, etc. of the various ratios for all the points may be determined, giving an overall fullness score e.g., the fullness value) for the 3D mapping. In this way, the fullness of the container (e.g., fullness with respect to packages within storage container 102) may be determined overtime and with respect to various, accurately located 3D points and measurements as the shipping container 102 is loaded.

It is to be noted that determining the fullness at each 3D point within the 3D container allows the container fullness app to account for any contour or shape a shipping container (e.g., a ULD) may have. For instance, for the AMJ shipping container type 156 of the shipping container 102 of FIG. 1A, the back wall of the ULD has an angled top piece. Using method 400, as described herein, with the container fullness app measuring the distance from point to the point in 3D mapping, as opposed to just assuming a straight back, the container fullness app is able to account for the space created or defined by the angled top piece. The same logic applies for containers having different or obscure shapes, such as angled/curved sides, as shown and demonstrated by the various shapes and configurations of the containers illustrated in FIG. 1B.

Figure 7:
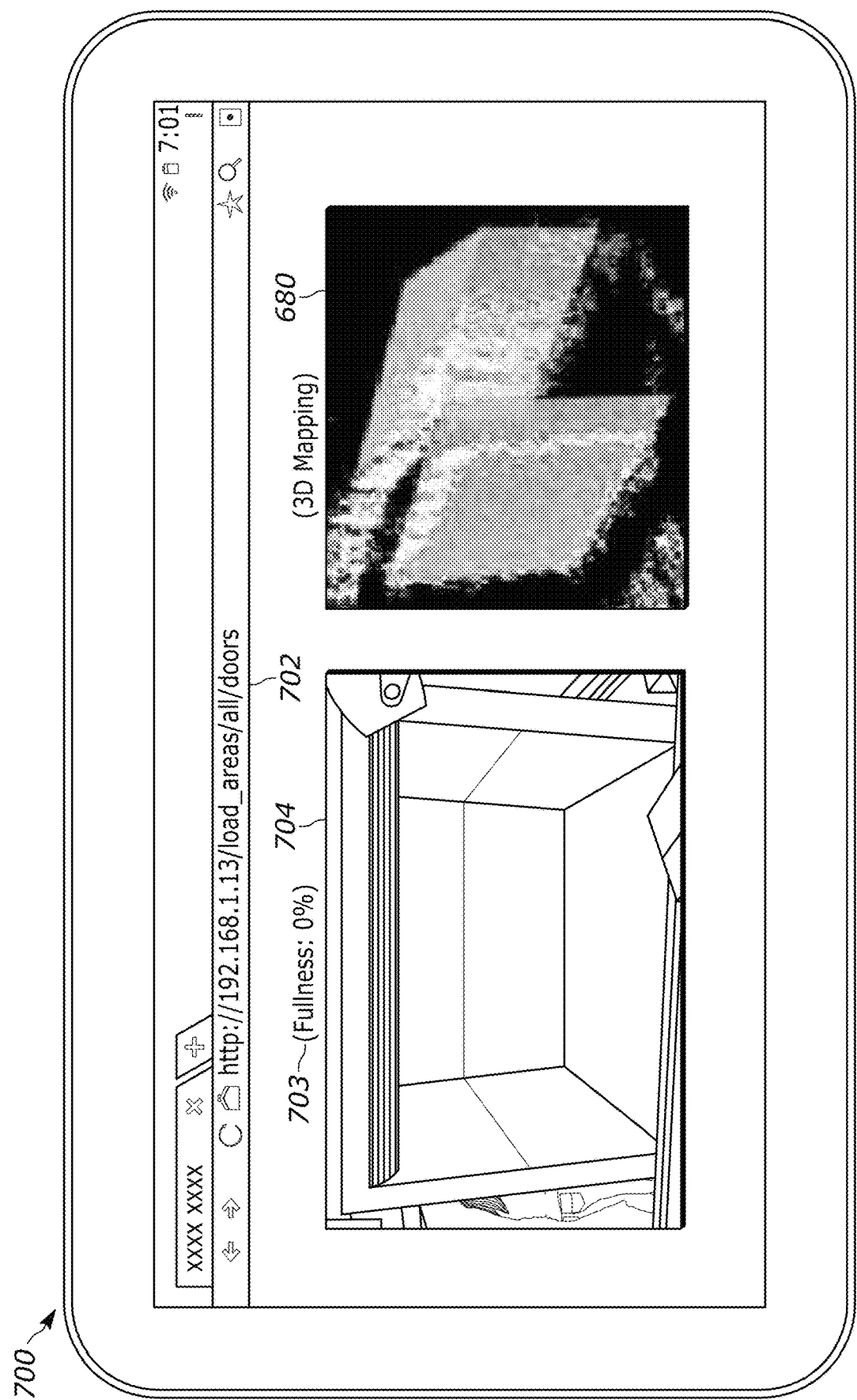
FIG. 7 illustrates a client device displaying a guided user interface (GUI) graphically indicating a fullness value of the shipping container of FIG. 1, and in accordance with the method of FIG. 4, and further in accordance with example embodiments herein.

FIG. 7 illustrates a client device 700 displaying a guided user interface (GUI) 702 graphically indicating a fullness value 703 of the shipping container 102 of FIG. 1A, and in accordance with the method of FIG. 4, and further in accordance with example embodiments herein. In some embodiments, GUI 702 may be rendered by a dashboard app installed and executing on client device 6700. Dashboard app may also display various operational metrics (not shown), which may include, for example, the start and end of the load for each container, the container idle time before its being loaded, the container idle time after its door is closed, etc. Such metrics provide valuable insights to users of the GUI, and overall system, for operational improvement.

In various embodiments, image data/datasets and/or operational metrics (as described herein) may be received on client device 700. Client device 700 may implement the dashboard app to receive the image data and/or the operational metrics and display such data, e.g., in graphical or other format, to a manager or loader to facilitate the unloading or loading of packages (e.g., 104, 107, etc.), as described herein. In some embodiments, dashboard app may be implemented as part of Zebra Technologies Corps.'s SmartPack™ container loading analytics (CLA) solution. The dashboard app may be installed on client devices (such as client device 700) operating in loading and shipping facilities (e.g., a loading facility as depicted by FIG. 1). Dashboard app may be implemented via a web platform such as Java J2EE (e.g., Java Server Faces) or Ruby on Rails. In such embodiments, the web platform may generate or update a user interface of the dashboard app via generation of a dynamic webpage (e.g., using HTML, CSS, JavaScript) or via a client-facing mobile app (e.g., via Java for a Google Android based app or Objective-C/Swift for an Apple iOS based app), where the user interface is displayed via the dashboard app on the client device, e.g., client device 700.

In some embodiments, the dashboard app may receive the image data/datasets and/or operational metrics and display such data in real-time. Client device 700 may be a mobile device, such as a tablet, smartphone, laptop, or other such mobile computing device. Client device 700 may implement an operating system or platform for executing the dashboard (or other) apps or functionality, including, for example, any of the Apple iOS platform, the Google Android platform, and/or the Microsoft Windows platform. Client device 700 may include one or more processors and/or one or more memories implementing the dashboard app or for providing other similar functionality. Client device 700 may also include wired or wireless transceivers for receiving image data and/or post-scanning data as described herein. Such wired or wireless transceivers may implement one or more communication protocol standards including, for example, TCP/IP, WiFi (802.11b), Bluetooth, or any other similar communication protocols or standards.

As shown in FIG. 7, GUI 702 graphically indicates the fullness value 703 (as a percentage of fullness) of the shipping container (e.g., shipping container 102). Further, in the embodiment of FIG. 7, a photorealistic image 704 of shipping container 102 is rendered by GUI 702 together with 3D mapping 680 (or a portion thereof) depicting the 3D points that container fullness app measures in order to determine fullness value 703. In the embodiment of FIG. 7, shipping container 102 is empty, thus container fullness app reports a fullness value of zero (0) percent (%).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A three-dimensional (3D) depth imaging system configured to automatically determining shipping container fullness based on imaging templates, the 3D depth imaging system comprising:
    a 3D-depth camera configured to capture 3D image data, the 3D-depth camera oriented in a direction to capture 3D image data of a shipping container located in a predefined search space during a shipping container loading session, the shipping container having a shipping container type; and
    a container fullness application (app) configured to execute on one or more processors communicatively coupled to the 3D-depth camera, the container fullness app further configured to:
        determine, based on 3D image data received from the 3D-depth camera, a 3D container point cloud representative of the shipping container,
        load, into a memory communicatively coupled to the one or more processors, an imaging template that defines a 3D template point cloud corresponding to the shipping container type, the 3D template point cloud comprising a 3D template front portion of the shipping container type and a 3D template back portion of the shipping container type,
        identify, within the 3D container point cloud, a 3D container front portion corresponding to a physical container front portion of the shipping container,
        generate a 3D mapping of the 3D container point cloud and the 3D template point cloud, the 3D mapping comprising the 3D container front portion of the 3D container point cloud aligned with the 3D template front portion of the 3D template point cloud, and
        determine, based on the 3D mapping, a fullness value of the shipping container.

2. The 3D depth imaging system of claim 1, wherein the 3D container point cloud representative of the shipping container is a cropped portion of point cloud data of the 3D image data received from the 3D-depth camera.

3. The 3D depth imaging system of claim 1, wherein the container fullness application determines the imaging template based on the 3D image data received from the 3D-depth camera, wherein a machine learning model, trained with 3D image data defining a plurality of shipping container types, inputs the 3D image data and outputs the shipping container type, and wherein the imaging template is loaded based on the shipping container type.

4. The 3D depth imaging system of claim 1, wherein generating the 3D mapping comprises executing a closest point algorithm that generates a 3D match score based on distances between a first set of 3D points of the 3D container point cloud and a second set of 3D points of the 3D template point cloud.

5. The 3D depth imaging system of claim 1, wherein the imaging template is a non-point cloud imaging template, and wherein in loading the imaging template includes converting, by the one or more processors, the non-point cloud template to the 3D template point cloud.

6. The 3D depth imaging system of claim 5, wherein the non-point cloud template is a computer aided design (CAD) model.

7. The 3D depth imaging system of claim 1, wherein the imaging template is preloaded into the memory.

8. The 3D depth imaging system of claim 1, wherein the shipping container is a unit load device (ULD).

9. The 3D depth imaging system of claim 8, wherein the shipping container type is a ULD type being one of: an AMJ type, an AAD type, an AKE type, an AYY type, a SAA type, an APE type, or an AQF type.

10. The 3D depth imaging system of claim 1, wherein the imaging template comprises a template of a unit load device (ULD).

11. The 3D depth imaging system of claim 1, wherein the 3D-depth camera and the one or more processors are housed in a mountable device.

12. The 3D depth imaging system of claim 1, wherein the one or more processors are located at a server communicatively coupled to the 3D-depth camera via a digital network.

13. The 3D depth imaging system of claim 1, wherein determining the fullness value comprises projecting the 3D mapping onto a two-dimensional (2D) grid corresponding to a storage area of the shipping container.

14. The 3D depth imaging system of claim 1, further comprising a dashboard app, the dashboard app executing on a client device implementing a guided user interface (GUI), the GUI graphically indicating the fullness value of the shipping container.

15. A three-dimensional (3D) depth imaging method for automatically determining shipping container fullness based on imaging templates, the 3D depth imaging method comprising:
- determining, based on 3D image data received from a 3D-depth camera, a 3D container point cloud representative of a shipping container, the shipping container located in a predefined search space during a shipping container loading session, the shipping container having a shipping container type;
- loading, into a memory communicatively coupled to one or more processors, an imaging template that defines a 3D template point cloud corresponding to the shipping container type, the 3D template point cloud comprising a 3D template front portion of the shipping container type and a 3D template back portion of the shipping container type;
- identifying, within the 3D container point cloud, a 3D container front portion corresponding to a physical container front portion of the shipping container;
- generating a 3D mapping of the 3D container point cloud and the 3D template point cloud, the 3D mapping comprising the 3D container front portion of the 3D container point cloud aligned with the 3D template front portion of the 3D template point cloud; and
- determining, based on the 3D mapping, a fullness value of the shipping container.

16. A tangible, non-transitory computer-readable medium storing instructions for automatically determining shipping container fullness based on imaging templates, that when executed by one or more processors of a computing device cause the one or more processors of the computing device to:
- determine, based on 3D image data received from a 3D-depth camera, a 3D container point cloud representative of a shipping container, the shipping container located in a predefined search space during a shipping container loading session, the shipping container having a shipping container type;
- load, into a memory communicatively coupled to one or more processors, an imaging template that defines a 3D template point cloud corresponding to the shipping container type, the 3D template point cloud comprising a 3D template front portion of the shipping container type and a 3D template back portion of the shipping container type;
- identify, within the 3D container point cloud, a 3D container front portion corresponding to a physical container front portion of the shipping container;
- generate a 3D mapping of the 3D container point cloud and the 3D template point cloud, the 3D mapping comprising the 3D container front portion of the 3D container point cloud aligned with the 3D template front portion of the 3D template point cloud; and
- determine, based on the 3D mapping, a fullness value of the shipping container.

\* \* \* \* \*